Figure 1:
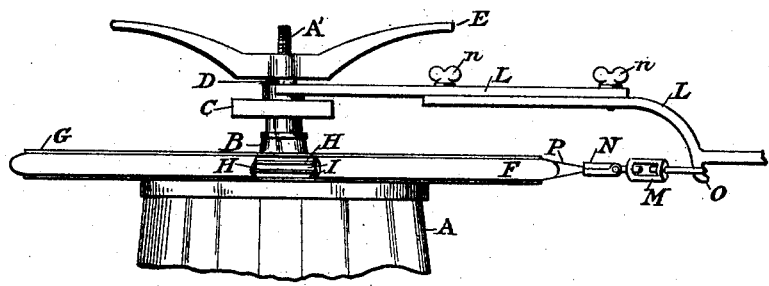

No. 692,276. Patented Feb. 4, 1902.
W. GUSSENHOVEN.
TIRE ADJUSTING DEVICE.
(Application filed Mar. 19, 1900. Renewed Nov. 26, 1901.)
(No Model.)

Witnesses: Inventor,
Walter Gussenhoven
By Albert Stetson,
Att'y

UNITED STATES PATENT OFFICE.

WALTER GUSSENHOVEN, OF NEW YORK, N. Y.

TIRE-ADJUSTING DEVICE.

SPECIFICATION forming part of Letters Patent No. 692,276, dated February 4, 1902.

Application filed March 19, 1900. Renewed November 26, 1901. Serial No. 83,813. (No model.)

*To all whom it may concern:*

Be it known that I, WALTER GUSSENHOVEN, a citizen of the United States, and a resident of New York, in the county of New York and State of New York, have invented certain new and useful Improvements in Tire-Adjusting Devices, of which the following is a specification.

My invention relates to means for attaching elastic tires to vehicle-wheels. It relates particularly to means for securing the even and regular distribution of the material of the elastic tire about the circumference of the wheel after the same has been fastened by the retaining-wires, so as to relieve the tire of all compression or strain in any of its parts.

Its object is therefore to avoid the most important defect of tires as at present applied— viz., the localization of compression or strain as an inherent quality of elastic tires—and to leave the tire when in place on the wheel in its natural and unconstrained state, which is the condition for proper working and durability of the tire.

Another object of my invention is to do away with the large, expensive, and cumbersome machines employed in fitting on tires, whereby it is necessary to send the wheels to certain large (perhaps distantly-situated) shops and to place in the hands of any wheelwright the means of perfectly fitting tires on vehicle-wheels. I have practically worked my invention on a large scale and have proved it to be simple and reliable in its application, only one man doing the work and results being attained that are impossible of accomplishment with the present expensive and cumbersome machines.

At present when tires are to be applied it is usual to employ three large machines, one for localizing compression of the rubber, the second for drawing up the wires, and a third for forcing back the compressed rubber. By the use of my present invention two of these expensive machines are done away with, and by the use of my clamping device, as simple as the present one, Serial No. 7,475 of 1900, filed March 6, 1900, the third is dispensed with. Hence by my system the necessity for sending the tires to a distance to be applied is avoided and the means are so cheap and simple as to be within the reach of every mechanic in the trade.

When tires are applied with retaining wires or bands, a space has to be left free for brazing or welding together the ends of the wires or bands, and this space is obtained by compressing the rubber back along the wires. To assure that the tire can be closed up at the joint, it is customary to cut the elastic portion of the tire a foot or eighteen inches longer than the circumference of the wheel-rim, the extra length of rubber being, as has been said, compressed along the wires. The space having been left, the wires are drawn up as tightly as possible, then joined, and the elastic tire forced back over the space left free and cemented together. This tends to leave a place or places in the circumference of the tire where there is compression, and when in use and under load this extra compression of rubber will creep around the tire, tending to tear the wire-holes and also causing the tire to open at the joint. These are the two great sources of deterioration in elastic tires. To obviate these disadvantages, I place in the tire-channel at various points on the circumference, under the tire when in place, a number of strips of pliable material, preferably oil-tanned rawhide, natural porpoise-hide, or its equivalent. By "equivalent" I mean a naturally self-lubricating substance, such that while offering a not too great resistance to the base and sides of the tire and the sides of the channel, will grip and slip along the same, the amount of gripping and sliding being under perfect control of the workman. I have found that in order to insure the successful working of my device the oil-tanned rawhide must be from time to time treated with oil to prevent its becoming dry through use and to preserve its slipping quality. By my arrangement I also avoid the great waste inherent in present methods of applying tires. Having all portions of the tire under perfect control, I can and do leave the rubber in every part of the tire in its natural state without compression or strain. I therefore do not have to cut my tire from a foot to eighteen inches— one inch to the foot of tire being the present waste—longer than the circumference of the channel, but I cut it to the length required for the ends of the rubber to meet when it is placed on the rim in its natural state. The extra rubber put in under compression is not only a waste, but is one of the greatest causes of deterioration of the tire.

Figure 2:
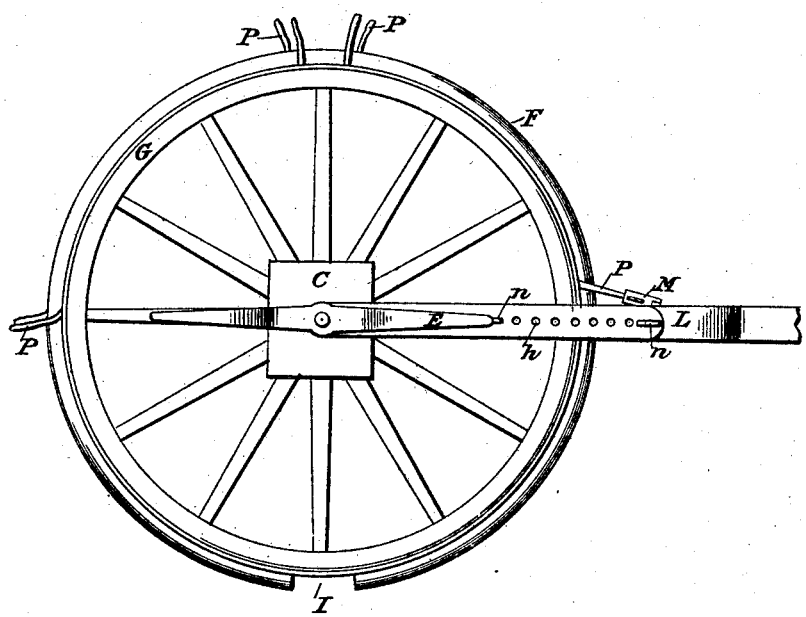
Figure 3:
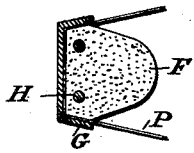
Figure 4:
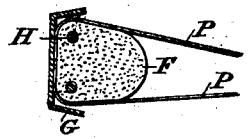

In the drawings, Figure 1 is an elevation of my device; Fig. 2, a top view of the same; Fig. 3, a cross-section of the tire and rim, showing my adjusting-strip in place; and Fig. 4 a view of the same, showing the adjusting-strip under strain and its action as regards the bottom and sides of the tire.

Referring to the drawings, A is the barrel or bench usually employed by wheelwrights, in the center of which is the floor-rod A', passing through the hub of the wheel B, upon which rests the fastening-block C, held in place by the sleeve D, acted upon by the lever E, working on the screw-threaded floor-rod A'.

F is the elastic tire; G, the rim; H, the retaining-wires, and I the space left for brazing the wires.

L is an adjustable lever working around the floor-rod, the length of the lever being adjusted by means of the nuts $n$ and the holes $h$.

Adapted to be attached to the lever L is the adjustable screw-brace M and the clamps N for receiving and holding the ends of the pliable strips P, which work the tire around the rim.

The operation is as follows: Before the tire F is attached to the wheel-channel any desired number of pliable strips P are placed at suitable positions in the wheel-channel, the ends of the strips projecting toward the tread of the tire. The tire is then placed in the channel and the rubber clamped back on the wires, so as to leave a space I for the brazing. The wheel is then firmly attached to the barrel or bench and the wires brazed. The lever can revolve freely about the floor-rod A' and is adjusted so as to leave the clamp N a proper distance from the tire, the distance depending upon whether we wish to exert a long pull lengthwise of the tire or a more direct upward pull to relieve the friction against the channel, (see Fig. 4,) said pull being always in the plane of the wheel. The lever is then swung around, the pliable strip grasped by the clamp N, and the rubber gently urged backward or forward, as may be necessary to close the gap I, without the rubber being put into any unnatural or strained condition, and so on for all the strips. When the tire is properly adjusted, the strips are pulled out either by hand or by leaving one end of the strip attached to the lever-clamp. When it is remembered that the retaining-wires have to be drawn exceeding tight, the advantage of my device over wires, metal strips, &c., will be appreciated.

The advantages resulting from the use of my device are many, of which I will enumerate the following: Such material as oil-tanned rawhide is pliable, strong, takes up little space, while perfectly conforming to the shape of the tire and channel, can be used over and over again and on all shapes and sizes of tires, does not injure the tire by cutting or tearing, and yet exerts a slipping grip thereon. It gives perfect control over the rubber by adjusting the distance between the attaching-point on the lever and the point of the tire operated upon. The more we shorten this distance, the more we relieve the friction between the channel and tire, and the more rubber will be urged backward or forward by moving the lever. I do away with all use of the mallet for hammering the rubber around the tire, which, with the tightly-stretched condition of the wires, cannot but be injurious, and under any circumstances the rubber cannot be hammered into the natural and unconstrained state in which my device leaves it.

I have particularly mentioned oil-tanned rawhide for my strip; but any material having the same qualities of pliability and little friction would answer my purpose.

Having thus fully described and illustrated my invention, what I claim is—

1. A strap for distributing the material of elastic tires on vehicle-wheels, composed of oil-tanned rawhide or its equivalent.

2. In a device for distributing elastic material on vehicle-wheels, the combination of an adjusting-strip of self-lubricating pliable material, adapted to conform easily and exactly to the shape of the tire and of the channel, an adjustable lever, and means for attaching the said strip to the lever, substantially as described.

3. In a device for adjusting elastic tires on vehicle-wheels the combination of one or more strips of rawhide suitably tanned and an adjustable lever adapted to be attached to the said strip, substantially as described.

4. An apparatus for adjusting elastic tires on vehicle-wheels composed of an adjustable lever adapted to revolve about the center of said wheel, self-lubricating pliable strips adapted to be placed under said tires and adjustable means for attaching said strips to said lever, substantially as described.

5. The method of adjusting elastic tires on vehicle-wheels, which consists in placing strips of oil-tanned rawhide, or similar material, at proper intervals about the circumference of the tire between the elastic tire and the vehicle-rim, and means for controlling these strips to distribute the elastic material in a natural and unconstrained state about the circumference of the vehicle-wheel, substantially as described.

Signed at New York, in the county of New York and State of New York, this 8th day of March, A. D. 1900.

WALTER GUSSENHOVEN.

Witnesses:
IRA J. ETTINGER,
A. STETSON.